Oct. 8, 1940.        C. E. SWENSON        2,217,082
RUBBER BEARING UNIVERSAL JOINT
Filed June 8, 1938

Inventor:
Carl E. Swenson.
By Edward C. Gritzbaugh
Atty.

Patented Oct. 8, 1940

2,217,082

UNITED STATES PATENT OFFICE 2,217,082

RUBBER BEARING UNIVERSAL JOINT

Carl E. Swenson, Rockford, Ill., assignor to Borg-Warner Corporation, Chicago, Ill., a corporation of Illinois Application June 8, 1938, Serial No. 212,400

3 Claims. (Cl. 64—17)

This invention relates to a yoke and spider type of universal joint and particularly to an improved form of yoke bearing socket and trunnion connection through the intermediary of a rubber block.

It is an object of the present invention to provide an improved form of inner periphery in the yoke bearing socket which will give an increased area of contact between the bearing socket and the rubber block for the same-overall diameter of universal joint without reducing the angular limits of operation of said joint to thus prolong the life of the rubber block and improve the operation of the joint. It is also an object to provide an improved form of trunnion whereby to increase the area of contact between the trunnion and the surrounding rubber block to further prolong the life of the rubber block and improve the operation of the joint.

A still further object of this invention is to provide a yoke bearing socket having an improved form of inner periphery whereby when the trunnion and socket are subjected to torque the ratio of compression stresses to shearing stresses is greatly increased over that of joints now in use. It is still another object to provide a trunnion having an improved cross-sectional contour whereby when the trunnion and yoke bearing sockets are subjected to torque, the ratio of compression stresses to shearing stresses is greatly increased over that of joints now in use.

Additional objects and more detailed features of my invention will become apparent from a reading of the following specification and claims taken in connection with the appended drawing forming a part of this specification and wherein:

Figure 1:
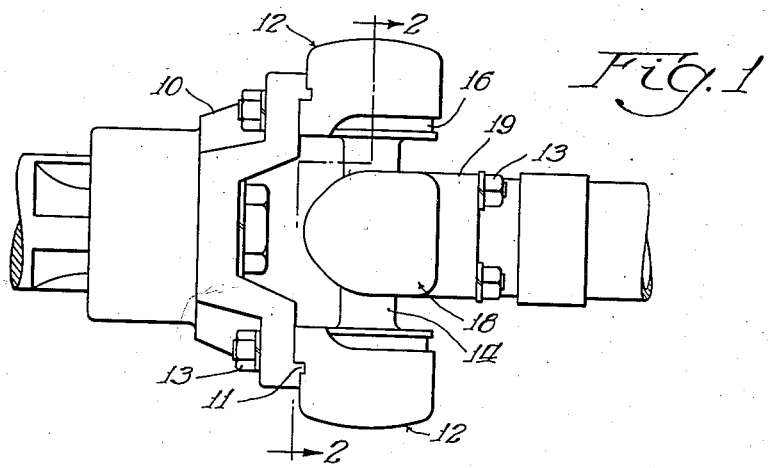
Fig. 1 is an assembly of a preferred modification.
Figure 2:
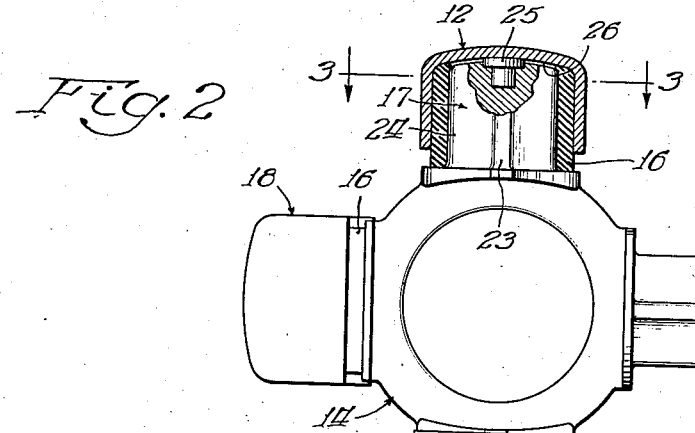
Fig. 2 is a partial section taken on line 2—2 of Fig. 1 with certain of the yoke and shaft structure omitted.
Figure 3:
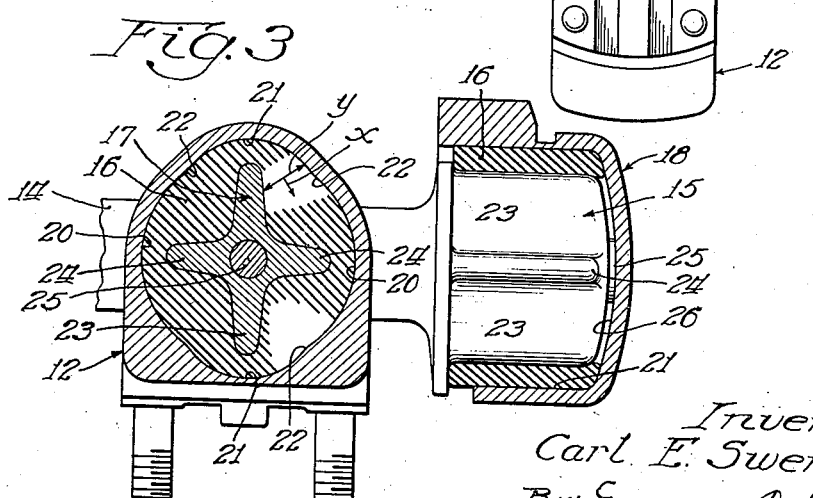
Fig. 3 is a partial section taken on line 3—3 of Fig. 2.

Referring in detail to the figures of the drawing, I have illustrated my invention as applied to the type of universal joint disclosed in Swenson Patent No. 1,985,669, my invention being distinguishable therefrom in the application thereto of an improved form of yoke bearing socket, spider trunnion and interposed rubber block.

Yoke or terminal coupling member 10 is milled to form arcuate pilot shoulders 11 for the reception and attachment of complementarily formed yoke bearing sockets 12. The back face of block 12 is formed with suitable radial slots and lugs for cooperation with similar elements on yoke 10 to which the block is fastened as by means of nuts and bolts 13 all of which is covered in the above referred to Swenson patent, further detail of which is not necessary to a disclosure of the present invention.

A spider 14 is provided with radially extending trunnions 15, specially formed in accordance with my invention as will appear. A pair of these trunnions 15 are received in oppositely disposed yoke bearing blocks 12 and mounted in rubber bearing blocks 16 supported by my specially constructed inner peripheral walls of the yoke bearing blocks. The other pair of trunnions 17 of spider 14 are likewise received in yoke bearing sockets 18 of a second yoke member 19.

I am aware that it is old in the prior art broadly to employ a rubber block in lieu of an antifriction bearing between the spider trunnion and the wall of the yoke bearing sockets as illustrated for example in the patent to Henry No. 1,997,488. I have discovered that by forming the inner periphery of the yoke bearing socket non-circular in cross-section, that a greater area of contact with the outer periphery of the rubber block is obtained for the same overall diameter of universal joint and also that this same arrangement has the further advantage of increasing the ratio between the component of force acting in the direction of the wall of the socket and the component of shearing force acting generally parallel thereto thus prolonging the life and efficiency of the joint. While almost any non-circular or irregular contour will tend to produce this result, I have found that it is particularly advantageous to form the inner periphery of the socket wall in the general shape of an ellipse with the longer axis thereof extending generally parallel to the axis of the yokes 10 and 19. More specifically, I prefer to form this wall with a pair of relatively large arcuate side wall portions 20 and a pair of relatively smaller arcuate end wall portions 21 joined together in a manner to define slight protuberances or hump portions 22.

While a spider trunnion of round cross-section will function to give satisfactory results in combination with the rubber block and above described irregular interior of bearing yoke 12, and I contemplate using this form in certain installations, I nevertheless have found that still further improvement is realized by constructing spider trunnions 15 and 17 with irregular contours. I prefer to form the spider trunnions with two pairs of radially extending wings including a first relatively long pair of wings 23 extending radially opposite to one another and generally parallel to the long axis of the ellipse and a second pair of wings 24 extending radially opposite to one another and generally parallel to the shorter axis of the ellipse.

It is thus apparent that when an attempt is made to turn the trunnion within its rubber mounting 16, forces will be set up in the rubber which may be divided into two components; one a compression force Y acting between the faces of the wing members and the opposed wall of the socket and a second force X which is a shearing force acting generally parallel to these faces. When this arrangement is compared with the usual structure wherein both the trunnion and the inner periphery of the bearing socket are circular in cross-section, it is readily seen that the ratio of Y to X is much greater in the present arrangement than in the circular structure.

The increased area of contact above described, together with the increase of ratio between compression and shearing stress results in a joint having a longer life and more satisfactory operating characteristics generally.

In order to absorb the end thrust wear and hence further add to the life and efficiency of this type of joint, I propose the use of thrust plugs 25 mounted in the ends of the trunnions and bearing against curved end wall 26 of yoke bearing sockets 12 and 18. As will be apparent from the drawing these end thrust bearings function to positively maintain the proper centering relation between the pivotal member 14 and the cup 12. This centering is particularly important when the joint is subject to the centrifugal forces accompanying rotation. While I have described these end thrust bearings as separable plugs 25 inserted in the end of the trunnion and prefer this construction since this plug may then be chosen for its bearing qualities, it will nevertheless be apparent that these end thrust bearing elements may in some installation be formed on the end of the trunnions. The important consideration is that these thrust bearings be circular, have a shape generally complementary to the curved inner periphery of the end wall of the socket and have an area which is equal to only a fraction of the total cross-section area of the end of the corresponding trunnion. It is believed to be clearly apparent that to allow the entire end of the cross-shaped trunnion to engage the socket end wall would result in fatal scraping with accompanying friction losses and probable early breakdown. Since the thrust loads are much lower than the torque loads this reduction in the ratio of area of surface subject to torque to the area of surface subject to end thrust resulting from the above arrangement is believed to be an improvement over old forms wherein this factor is not taken into consideration.

While I have described my invention in connection with one specific embodiment thereof it is to be understood that this is by way of illustration and not by way of limitation and that the scope of my invention is defined solely by the appended claims which should be construed as broadly as the prior art will permit.

I claim:

1. In a universal joint including a pair of yokes, an intermediate pivotal member having radially extending trunnions mounted in rubber blocks confined within sockets carried by said yokes, the improvement comprising the formation of said sockets with a non-circular cross-section, the greatest cross-sectional dimension thereof being disposed generally in the direction of the axis of the corresponding yokes, said socket including an end wall, said trunnions being non-circular in cross-section with the greatest cross-sectional dimension thereof disposed in the direction of the general axis of said joint, and a bearing plug mounted in the end of each of said trunnions in contact with said end walls of said sockets, each of said bearing plugs having an area equal to only a fraction of the cross-sectional area of the end of the corresponding trunnions, said bearing plugs functioning to positively center said intermediate pivotal member relative to said socket end walls.

2. In a universal joint of the intermediate pivotal member type comprising a yoke socket, a trunnion of said intermediate pivotal member received in said socket, a rubber block closely embracing said trunnion and in turn closely confined within said socket, said arrangement being particularly characterized by the fact that said socket is composed of side walls and an end wall, said side walls being elliptical-like in cross-section, the major axis of said ellipse extending generally in the axial direction of said joint, said trunnions being cross-like in radial cross-section, one pair of opposed arms of said cross extending generally along the major axis of said ellipse and the other opposed arms extending normally generally along the minor axis of said ellipse, and a bearing thrust plug of relatively small area mounted in the end of said trunnion and in contact with said end wall of said socket.

3. In a universal joint including a pair of yokes, an intermediate pivotal member having radially extending trunnions mounted in rubber blocks confined within sockets carried by said yokes, the improvement comprising the formation of said sockets with a non-circular cross-sectional interior, the greatest cross-sectional dimension thereof being disposed generally in the direction of the axis of the corresponding yoke, said sockets each including a curved end wall, said trunnions each being non-circular in cross section, and a positive end thrust bearing on the end of each of said trunnions each having an area equal to only a fraction of the total cross sectional area of the associated trunnion and located coaxially relative to said trunnion, said end thrust bearing being in contact with said end walls of said socket and functioning to positively center said intermediate pivotal member relative to said sockets.

CARL E. SWENSON.